(12) United States Patent
Takahashi et al.

(10) Patent No.: US 11,631,979 B2
(45) Date of Patent: Apr. 18, 2023

(54) CHARGING CONTROL SYSTEM, AUTONOMOUS TRAVELING WORK MACHINE, AND CHARGING STATION

(71) Applicant: HONDA MOTOR CO., LTD., Tokyo (JP)

(72) Inventors: Hiroya Takahashi, Wako (JP); Takumi Shiiyama, Wako (JP); Yoshiaki Kotani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/003,464

(22) Filed: Aug. 26, 2020

(65) Prior Publication Data

US 2021/0066933 A1    Mar. 4, 2021

(30) Foreign Application Priority Data

Sep. 4, 2019   (JP) .............................. JP2019-161101

(51) Int. Cl.
| | |
|---|---|
| *H02J 50/90* | (2016.01) |
| *H02J 7/00* | (2006.01) |
| *G05D 1/02* | (2020.01) |
| *H02J 50/10* | (2016.01) |

(52) U.S. Cl.
CPC ........ *H02J 7/00036* (2020.01); *G05D 1/0259* (2013.01); *H02J 50/10* (2016.02); *H02J 50/90* (2016.02); *G05D 2201/0208* (2013.01)

(58) Field of Classification Search
CPC .................................................... H02J 7/0026

USPC ......................................................... 320/108
See application file for complete search history.

(56) References Cited

U.S. PATENT DOCUMENTS

| | | | | |
|---|---|---|---|---|
| 2005/0267629 | A1* | 12/2005 | Petersson .................. | B60L 3/12 701/23 |
| 2006/0273749 | A1* | 12/2006 | Im ......................... | G05D 1/0225 318/587 |
| 2014/0015341 | A1* | 1/2014 | Kagami .................. | H02J 50/12 307/104 |
| 2017/0331335 | A1* | 11/2017 | Brooks .................... | H02J 50/60 |
| 2018/0014709 | A1* | 1/2018 | O'Brien ................ | A47L 9/2884 |
| 2018/0138752 | A1* | 5/2018 | Wilson .................... | H02J 50/80 |
| 2018/0254654 | A1* | 9/2018 | Ikefuji .................... | H02J 50/60 |
| 2020/0044482 | A1* | 2/2020 | Partovi ................. | G06F 1/1683 |
| 2020/0094700 | A1* | 3/2020 | Hui ......................... | B60L 53/39 |

FOREIGN PATENT DOCUMENTS

JP          2017-010161         1/2017

* cited by examiner

*Primary Examiner* — Edward Tso
*Assistant Examiner* — Ahmed H Omar
(74) *Attorney, Agent, or Firm* — Rankin, Hill & Clark LLP

(57) ABSTRACT

A wireless power supply system includes a mower that executes a mowing work while traveling autonomously, and a charging station that supplies power to the mower. The charging station includes a power supply coil, and the mower includes a power reception coil, a first detector that detects a magnetic field generated by the power supply coil, and a first traveling controller that causes the mower to travel toward the charging station, based on a detection result of the first detector.

10 Claims, 10 Drawing Sheets

FIG.6
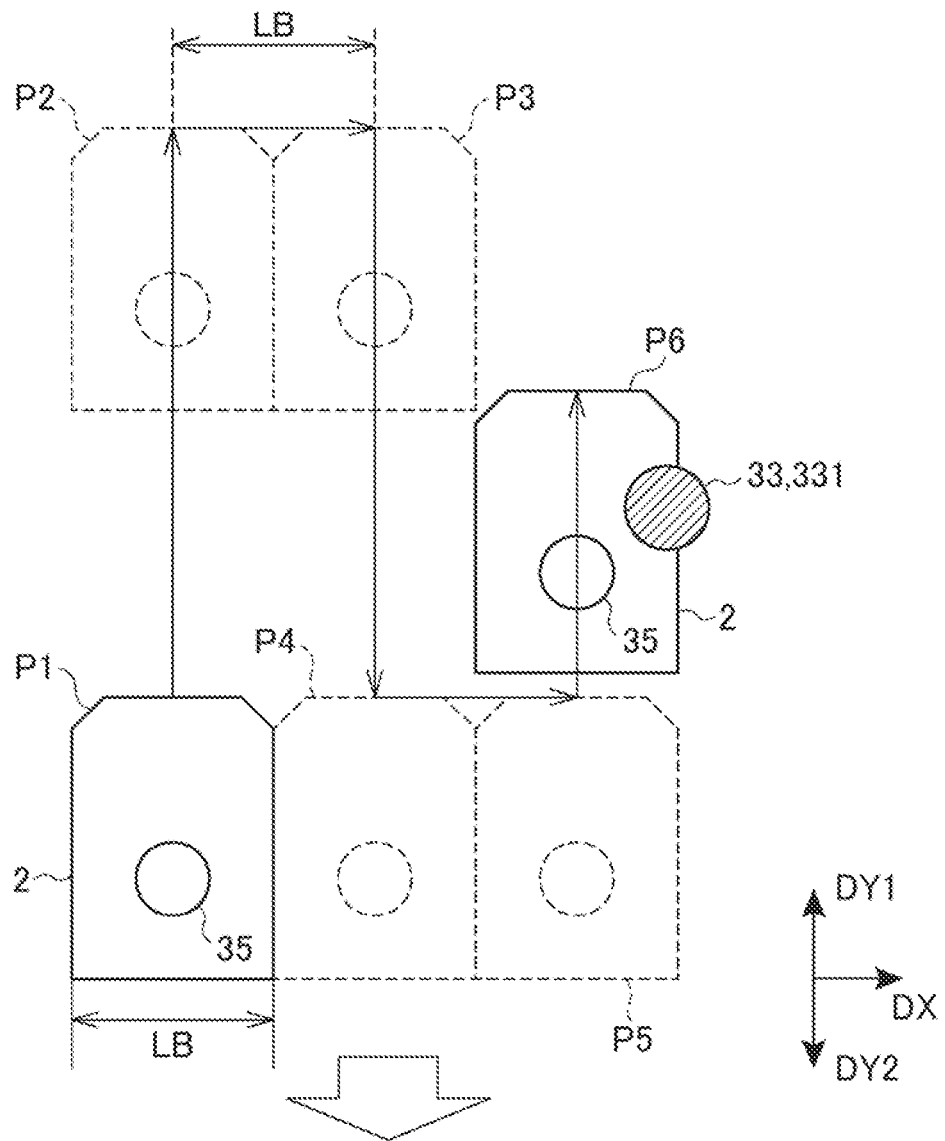
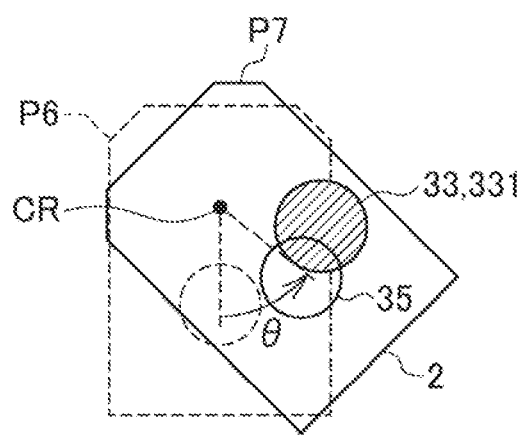

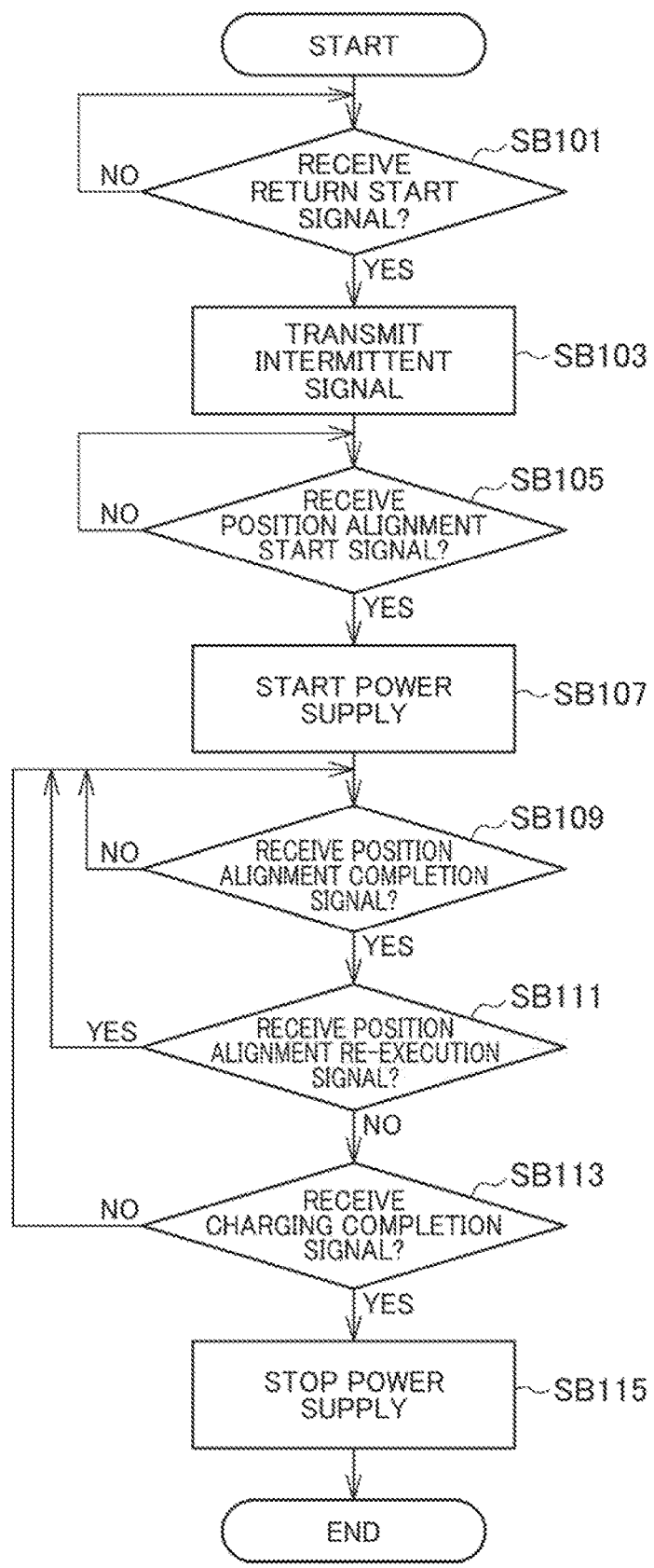

CHARGING CONTROL SYSTEM, AUTONOMOUS TRAVELING WORK MACHINE, AND CHARGING STATION

INCORPORATION BY REFERENCE

The present application claims priority under 35 U.S.C. § 119 to Japanese Patent Application No. 2019-161101 filed on Sep. 4, 2019. The content of the application is incorporated herein by reference in its entirety.

BACKGROUND OF THE INVENTION

Field of the Invention

The present invention relates to a charging control system, an autonomous traveling work machine, and a charging station.

Description of the Related Art

One of known autonomous traveling work machines that work while traveling autonomously is a mower that travels autonomously in a lawn area to execute a mowing work (see, for example, Japanese Patent Laid-Open No. 2017-10161).

A mower disclosed in Japanese Patent Laid-Open No. 2017-10161 is driven by a battery, and the battery is charged by being connected to a charging station. Furthermore, the mower includes a magnetic sensor. When a voltage shortage of the battery is detected, the magnetic sensor detects the strength of a magnetic field generated by an area wire in the work area, and the mower thereby returns to the charging station.

Unfortunately, the mower disclosed in Japanese Patent Laid-Open No. 2017-10161 requires installation of the area wire around the work area for returning to the charging station, and furthermore the mower needs to include the magnetic sensor, leaving room for simplification of the configuration.

The present invention aims to provide a charging control system capable of, with a simple configuration, causing an autonomous traveling work machine to travel toward a charging station, an autonomous traveling work machine, and a charging station.

SUMMARY OF THE INVENTION

An aspect of the present invention is a charging control system including an autonomous traveling work machine configured to execute a predetermined work while traveling autonomously, and a charging station configured to supply power to the autonomous traveling work machine, wherein the charging station includes a power supply coil; and the autonomous traveling work machine includes a power reception coil, a first detector configured to detect a magnetic field generated by the power supply coil, and a first traveling controller configured to cause the autonomous traveling work machine to travel toward the charging station, based on a detection result of the first detector.

In the charging control system according to the aspect of the present invention, the first detector may use the power reception coil to detect the magnetic field generated by the power supply coil.

In the charging control system according to the aspect of the present invention, the autonomous traveling work machine may include a magnetic sensor, and the first detector may use the magnetic sensor to detect the magnetic field generated by the power supply coil.

In the charging control system according to the aspect of the present invention, the autonomous traveling work machine may include a first determiner configured to determine whether the autonomous traveling work machine has arrived at a predetermined range from the charging station, based on the detection result of the first detector; a second detector configured to, when the first determiner determines that the autonomous traveling work machine has arrived at the predetermined range, detect power received by the power reception coil from the power supply coil; and a second traveling controller configured to cause the autonomous traveling work machine to travel, according to a detection result of the second detector.

In the charging control system according to the aspect of the present invention, the autonomous traveling work machine may include a battery and a charging controller configured to cause the power reception coil to receive power from the power supply coil, thereby charging the battery; the second traveling controller may cause the autonomous traveling work machine to travel back and forth and from side to side, and stop traveling of the autonomous traveling work machine at a position where the power detected by the second detector is equal to or more than a power threshold; and when the second traveling controller stops the traveling of the autonomous traveling work machine, the charging controller may start charging of the battery.

In the charging control system according to the aspect of the present invention, the autonomous traveling work machine may include a battery and a charging controller configured to cause the power reception coil to receive power from the power supply coil, thereby charging the battery; the second traveling controller may cause the autonomous traveling work machine to turn, and stop turning of the autonomous traveling work machine at a position where the power detected by the second detector is equal to or more than a power threshold; and when the second traveling controller stops the turning of the autonomous traveling work machine, the charging controller may start charging of the battery.

In the charging control system according to the aspect of the present invention, the autonomous traveling work machine may include a battery and a charging controller configured to cause the power reception coil to receive power from the power supply coil, thereby charging the battery; the charging station may include a plurality of the power supply coils; the autonomous traveling work machine may include a determiner configured to determine, of the plurality of power supply coils, a power supply coil in which the power detected by the second detector is equal to or more than a power threshold; and the charging controller may charge the battery through power reception of the power reception coil only from the power supply coil determined by the determiner.

In the charging control system according to the aspect of the present invention, the autonomous traveling work machine may include a second determiner configured to determine whether a predetermined condition is satisfied, and a return instruction unit configured to, when the second determiner determines that the predetermined condition is satisfied, cause the first traveling controller to start traveling of the autonomous traveling work machine toward the charging station.

In the charging control system according to the aspect of the present invention, the autonomous traveling work machine may include a first transmitter configured to, when the second determiner determines that the predetermined condition is satisfied, transmit a specific signal to the charging station via the power reception coil, and a first receiver configured to receive a signal from the charging station; the charging station may include a second receiver configured to receive the specific signal via the power supply coil, and a second transmitter configured to, when the specific signal is received by the second receiver, intermittently transmit a signal indicating a position of the charging station, via the power supply coil; and the first receiver may receive the signal indicating the position of the charging station, via the power reception coil.

In the charging control system according to the aspect of the present invention, the predetermined condition may include a condition that a remaining amount of the battery is equal to or less than a remaining amount threshold.

An aspect of the present invention is an autonomous traveling work machine configured to execute a predetermined work while traveling autonomously, wherein the autonomous traveling work machine includes a power reception coil, a first detector configured to detect a magnetic field generated by a power supply coil disposed in a charging station, and a first traveling controller configured to cause the autonomous traveling work machine to travel toward the charging station, based on a detection result of the first detector.

An aspect of the present invention is a charging station configured to supply power to an autonomous traveling work machine configured to execute a predetermined work while traveling autonomously, wherein the charging station includes a power supply coil; a magnetic field generated by the power supply coil is detected by the autonomous traveling work machine; and based on the detected magnetic field, the autonomous traveling work machine is caused to travel toward the charging station.

According to the aspects of the present invention, the autonomous traveling work machine can be caused to travel toward the charging station, with a simple configuration.

BRIEF DESCRIPTION OF THE DRAWINGS

FIG. 6 is a plan view showing an example of position alignment processing;

FIG. 10 is a flowchart showing an example of processing of the second controller.

DETAILED DESCRIPTION OF THE PREFERRED EMBODIMENT

Hereinafter, an embodiment will be explained with reference to the drawings.

1. Configuration of Unmanned Mowing System

[1-1. Overall Configuration of Unmanned Mowing System]

Figure 1:
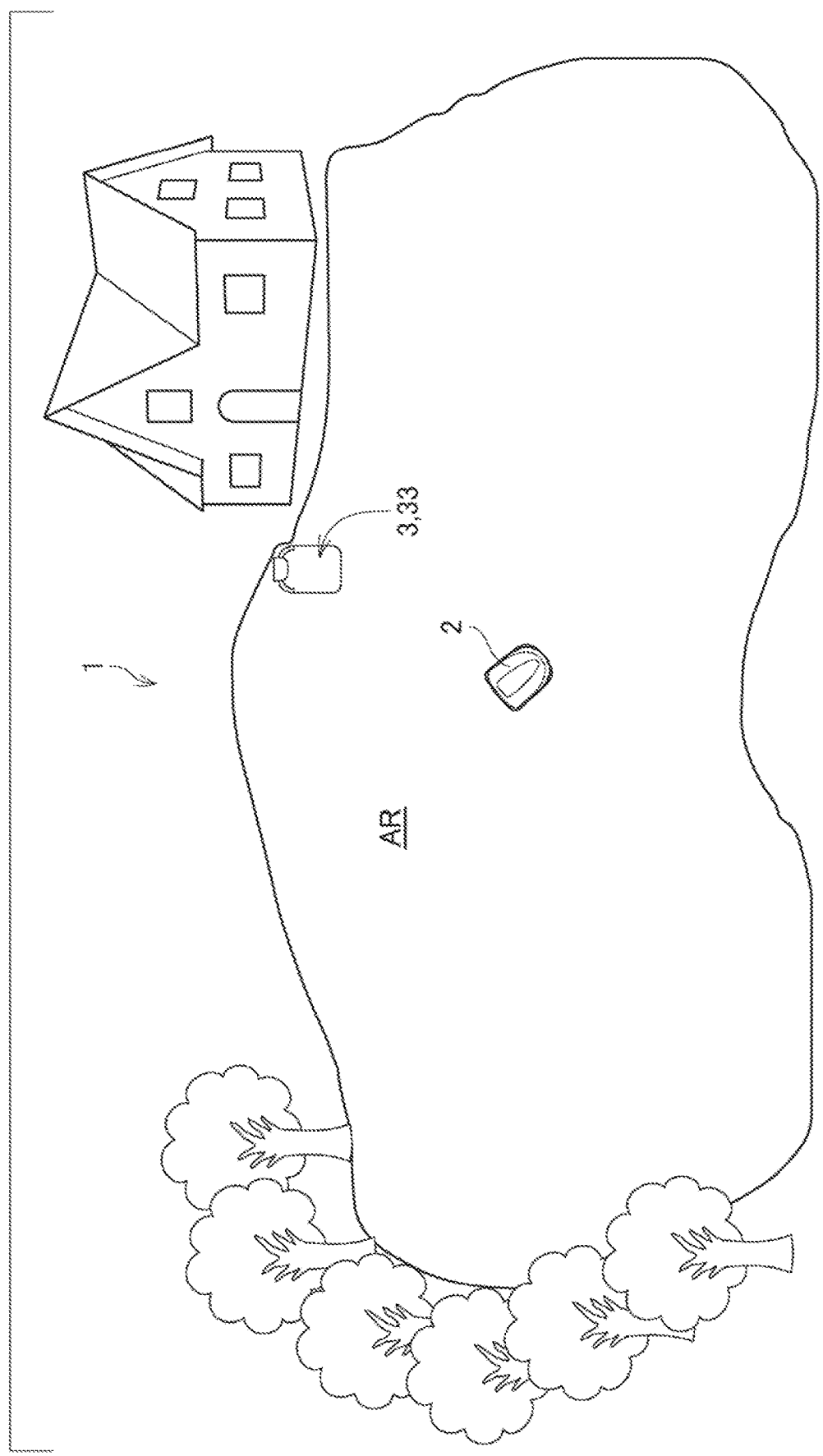
FIG. 1 is a view showing an example of a configuration of an unmanned mowing system according to an embodiment of the present invention.

FIG. 1 is a view showing a configuration of an unmanned mowing system 1 according to the present embodiment.

The unmanned mowing system 1 includes a robotic mower 2 and a charging station 3. A mowing area AR is where the robotic mower 2 executes a mowing work.

The robotic mower 2 is an autonomous traveling work machine that cuts grass while traveling autonomously in the mowing area AR in an unmanned manner. The robotic mower 2 detects a position in the mowing area AR based on a relative position that uses the charging station 3 as a reference. A method for detecting the relative position that uses the charging station 3 as a reference will be explained later in detail with reference to FIG. 4. The robotic mower 2 corresponds to an example of an "autonomous traveling work machine."

The charging station 3 has a power supplier 33 that supplies power to the robotic mower 2 and is installed in the mowing area AR. The power supplier 33 will be explained later in detail with reference to FIG. 3. The charging station 3 is also a standby location of the robotic mower 2 at the time of non-working. At the end of the mowing work, the robotic mower 2 autonomously travels to return to the charging station 3 and is charged as necessary at the charging station 3.

[1-2. Configuration of Robotic Mower]

Figure 2:
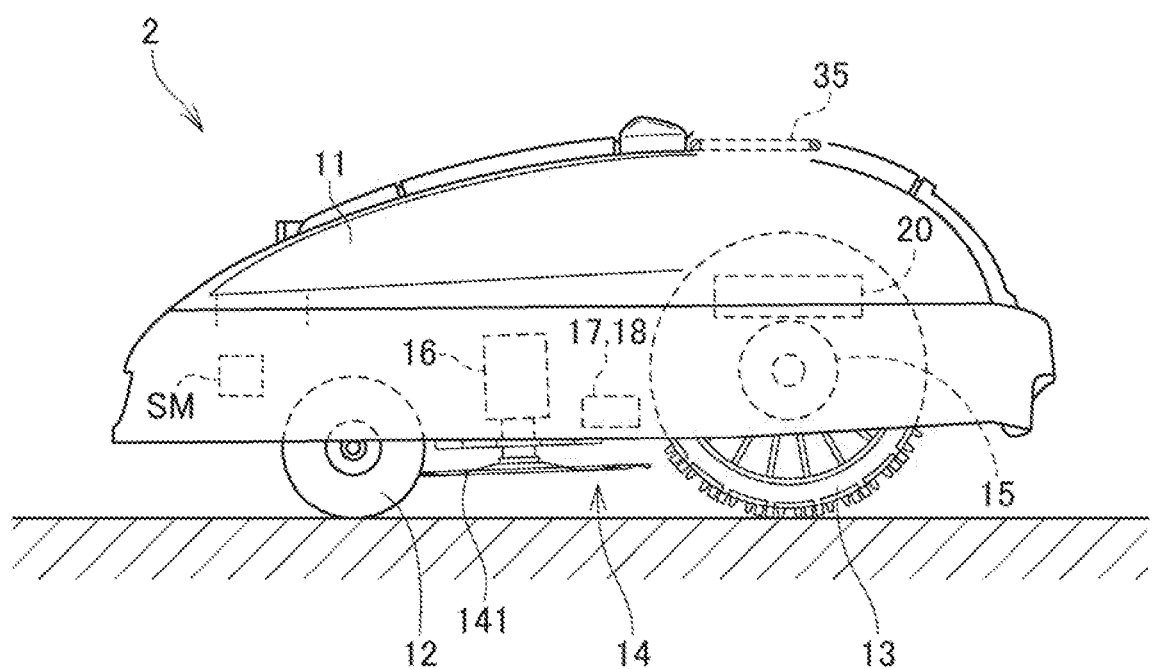
FIG. 2 is a side view showing an example of a configuration of an autonomous traveling work machine.

FIG. 2 is a side view showing an example of a configuration of the robotic mower 2 according to the present embodiment.

The robotic mower 2 may be referred to as the mower 2 in the following explanation.

The mower 2 includes a housing 11, right and left front wheels 12 provided at a front portion of the housing 11, right and left rear wheels 13 provided at a rear portion of the housing 11, and a work unit 14 provided at a lower center portion of the housing 11. The work unit 14 has a cutting blade disc 141 provided with a cutting blade. The cutting blade disc 141 is rotationally driven, so that grass can be cut.

The mower 2 includes right and left traveling motors 15, a work unit driving motor 16, a battery 17, a charging control circuit 18, a first controller 20, and a power reception coil 35.

The housing 11 stores the right and left traveling motors 15, the work unit driving motor 16, the battery 17, the charging control circuit 18, and the first controller 20.

The right and left traveling motors 15 individually drive the respective right and left rear wheels 13. The traveling motor 15 drives the rear wheel 13 according to an instruction of the first controller 20, thereby causing the mower 2 to travel. The work unit driving motor 16 rotationally drives the cutting blade disc 141 of the work unit 14. The work unit driving motor 16 rotationally drives the cutting blade disc 141 of the work unit 14 according to an instruction of the first controller 20, thereby executing the mowing work.

The power reception coil 35 is disposed on, for example, an upper portion of the housing 11 and receives power from the power supplier 33 of the unmanned mowing system 1. A configuration of the power reception coil 35 will be explained later in detail with reference to FIG. 3.

The first controller 20 controls an operation of each unit of the mower 2. The first controller 20 has, for example, a first processor 20A such as a central processing unit (CPU) and a first memory 20B such as a random access memory (RAM) or a read only memory (ROM). The first memory 20B stores map data on the mowing area AR, mowing work schedule data, and data of, for example, a first control program. A configuration of the first controller 20 will be explained in detail with reference to FIG. 4.

The battery 17 supplies operation power to each unit of the mower 2.

The charging control circuit 18 charges the battery 17 with the power received by the power reception coil 35, according to an instruction of the first controller 20. The charging control circuit 18 will be explained later in detail with reference to FIG. 4.

In the present embodiment, the charging station 3 and the mower 2 constitute a wireless power supply system 30 that wirelessly supplies power from the charging station 3 to the mower 2. This wireless power supply system 30 does not require the mower 2 to include an electrode that mechanically engages the charging station 3 for power reception, thus allowing the mower 2 to have improved waterproof, dustproof, and insulating properties.

The mower 2 may include a magnetic sensor SM that detects the strength and direction of a magnetic field. Specifically, the magnetic sensor SM is a three-dimensional magnetic sensor that detects the strength of magnetism in three-axis directions orthogonal to each other. Specifically, the magnetic sensor SM includes a sensor such as a Hall element, a magnetoresistive element, or a GHz spin rotation (GSR) sensor.

The mower 2 including the magnetic sensor SM can accurately detect a magnetic field generated by the power supplier 33.

2. Configuration of Wireless Power Supply System

[2-1. Overall Configuration of Wireless Power Supply System]

Figure 3:
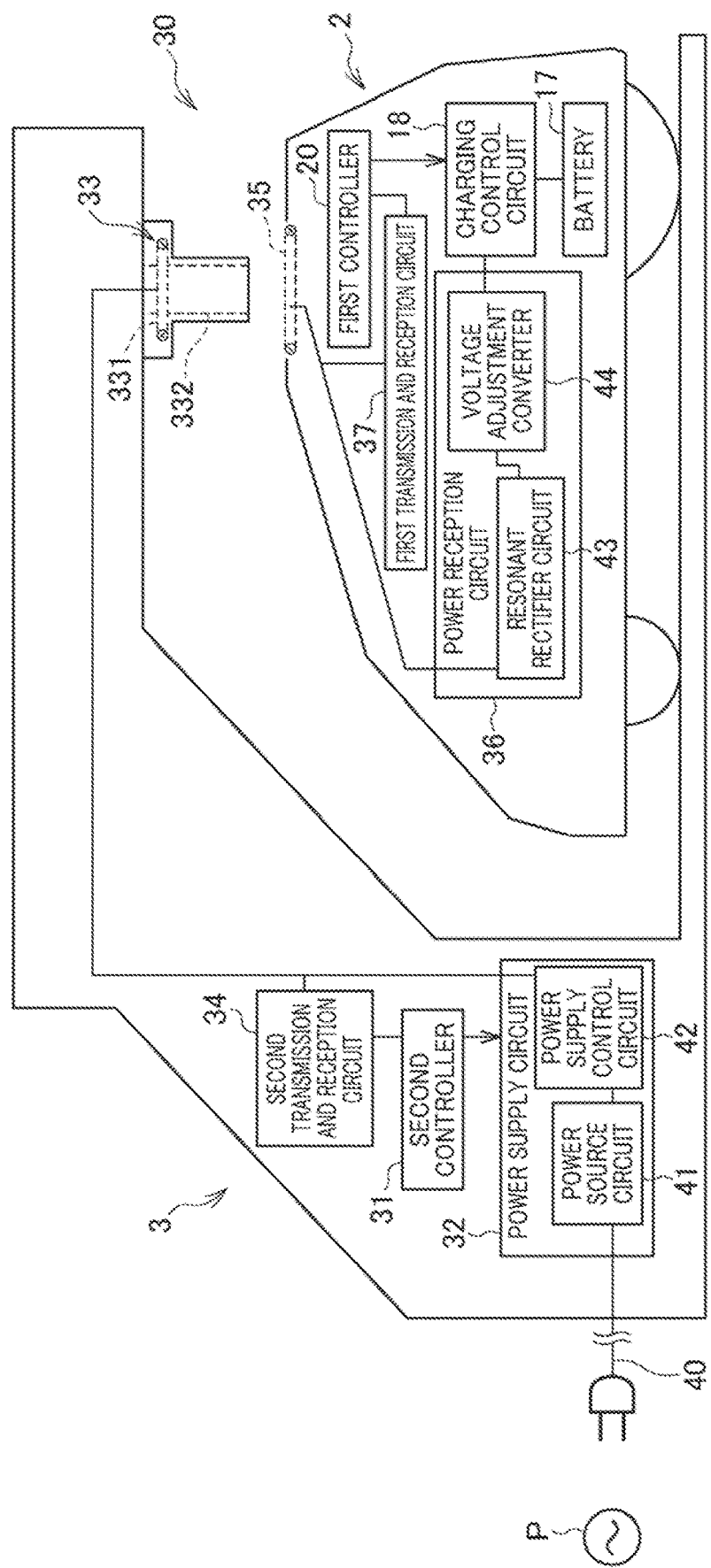
FIG. 3 is a side view showing an example of an overall configuration of a wireless power supply system.

FIG. 3 is a view showing an overall configuration of the wireless power supply system 30.

The wireless power supply system 30 is a system that transmits and receives power in a non-contact manner by using electromagnetic induction, and the charging station 3 includes a power supply circuit 32 and the power supplier 33 as shown in FIG. 3. The power supplier 33 includes a power supply coil 331 and a power supply core 332. Furthermore, the mower 2 includes the power reception coil 35 and a power reception circuit 36.

The wireless power supply system 30 corresponds to an example of a "charging control system."

The power supply circuit 32 is a circuit connected to a commercial power source P via a power source cord 40 and allows the power supplier 33 to supply commercial power of the commercial power source P. The power supply circuit 32 includes a power source circuit 41 that converts the commercial power into supplied power, and a power supply control circuit 42 that outputs to the power supplier 33 an AC voltage (AC current) having a predetermined frequency according to the supplied power.

The power supply coil 331 is a coil for power supply. The power supply core 332 is a columnar member made of a magnetic material and disposed in a state of being inserted into the power supply coil 331.

The power reception coil 35 is a coil for power extraction and magnetically couples with the power supply coil 331 that generates an alternating magnetic field by using the AC current to generate an induced electromotive force by using electromagnetic induction, thereby receiving power from the power supply coil 331.

The wireless power supply system 30 in the present embodiment wirelessly supplies power in the state where the power supply core 332 is inserted into the power supply coil 331, and magnetic coupling between the power supply coil 331 and the power reception coil 35 is thereby strengthened, enhancing energy transmission efficiency between the power supply coil 331 and the power reception coil 35.

The power reception circuit 36 generates charging power from the induced electromotive force generated in the power reception coil 35 and includes a resonant rectifier circuit 43 and a voltage adjustment converter 44.

The resonant rectifier circuit 43 is a circuit that causes the power reception coil 35 to resonate with the alternating magnetic field (AC current) of the power supply coil 331 and causes the power reception coil 35 to thereby generate a sine wave current, rectifying this current and thereby outputting a DC voltage.

The voltage adjustment converter 44 is a circuit that converts the DC voltage output by the resonant rectifier circuit 43 into a DC voltage having a predetermined voltage value used for charging and outputs the resultant DC voltage. This DC voltage is applied to the battery 17 by the charging control circuit 18, thereby charging the battery 17.

Note that in the wireless power supply system 30, materials of the power supply coil 331, the power supply core 332, and the power reception coil 35 and structures thereof (sizes and shapes and the like) are any ones capable of wirelessly supplying desired power.

Here, in the wireless power supply system 30 with the electromagnetic induction method, as a distance for transmitting energy in a non-contact manner, that is, a distance between the power supply coil 331 and the power reception coil 35 becomes longer, to transmit and receive the same power, each of the power supply coil 331 and the power reception coil 35 needs to have an increased diameter, and the power supply core 332 needs to have an increased size. Thus, the power supply core 332 tends to be relatively increased in size and heavy in weight.

In contrast, as described above, this wireless power supply system 30 has the power supply core 332 provided on the side of the charging station 3. This reduces an increase in weight of the mower 2, and negative effects are thereby prevented, such as impairment of portability of the mower 2, that is, impairment of ease of carrying for a user, and ruts easily remaining on a lawn. Furthermore, the power supply core 332 is not provided on the side of the mower 2 carried by the user, thus preventing breakage of the power supply core 332, which is relatively easily cracked.

Furthermore, the mower 2 includes a first transmission and reception circuit 37, and the charging station 3 includes a second transmission and reception circuit 34.

The first transmission and reception circuit 37, according to an instruction of the first controller 20, transmits and receives a variety of signals to and from the second transmission and reception circuit 34 via the power reception coil 35 and the power supply coil 331.

The second transmission and reception circuit 34, according to an instruction of a second controller 31, transmits and receives a variety of signals to and from the first transmission and reception circuit 37 via the power supply coil 331 and the power reception coil 35.

Specifically, when a variety of signals are transmitted from the power reception coil 35 to the power supply coil 331, the first transmission and reception circuit 37 uses power from the battery 17 to cause a current corresponding to the signal to flow to the power reception coil 35. The second transmission and reception circuit 34 uses the power supply coil 331 to detect variations in a magnetic field generated by the power reception coil 35 and receives the signal from the power reception coil 35.

Furthermore, when a variety of signals are transmitted from the power supply coil 331 to the power reception coil 35, the second transmission and reception circuit 34 uses power from a commercial power source to cause a current corresponding to the signal to flow to the power supply coil 331. The first transmission and reception circuit 37 uses the power reception coil 35 to detect variations in a magnetic field generated by the power supply coil 331 and receives the signal from the power supply coil 331.

Although in the present embodiment, the mower 2 and the charging station 3 transmit and receive a variety of signals via the power reception coil 35 and the power supply coil 331, embodiments of the present invention are not limited to this. The mower 2 and the charging station 3 may transmit and receive a variety of signals via wireless communication such as Wi-Fi (registered trademark).

[2-2. Configurations of First and Second Controllers]
[2-2-1. Configuration of First Controller]

Figure 4:
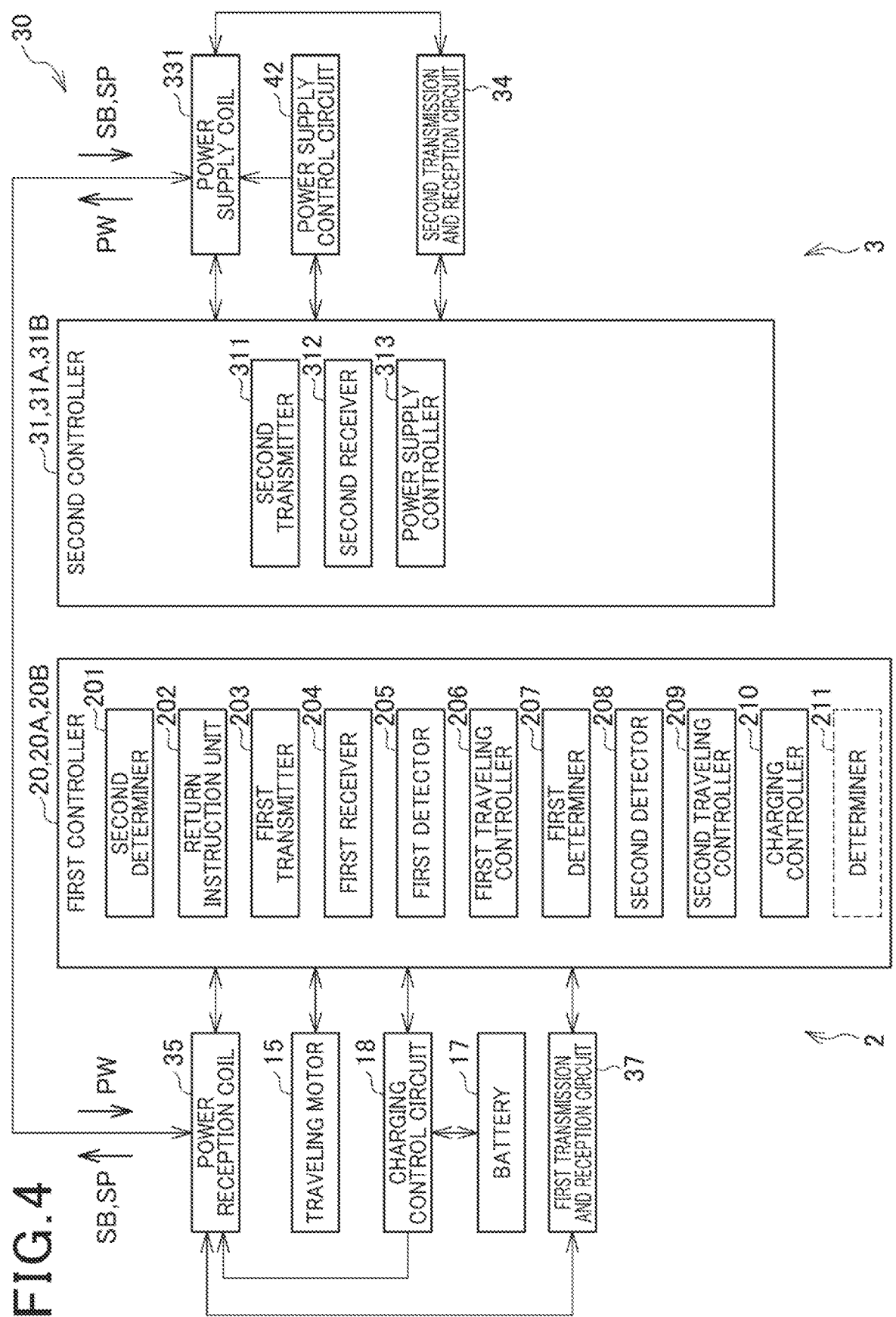
FIG. 4 is a view showing examples of configurations of a first controller and a second controller.

FIG. 4 is a view showing examples of configurations of the first controller 20 and the second controller 31.

The first controller 20 includes a second determiner 201, a return instruction unit 202, a first transmitter 203, a first receiver 204, a first detector 205, a first traveling controller 206, a first determiner 207, a second detector 208, a second traveling controller 209, a charging controller 210, and a determiner 211. Specifically, the first processor 20A of the first controller 20 executes the first control program stored in the first memory 20B to function as the second determiner 201, the return instruction unit 202, the first transmitter 203, the first receiver 204, the first detector 205, the first traveling controller 206, the first determiner 207, the second detector 208, the second traveling controller 209, the charging controller 210, and the determiner 211.

The second determiner 201 determines whether a predetermined condition is satisfied. The predetermined condition indicates that, for example, the remaining amount of the battery 17 is equal to or less than a remaining amount threshold.

Although in the present embodiment, the predetermined condition is that the remaining amount of the battery 17 is equal to or less than the remaining amount threshold, embodiments of the present invention are not limited to this. The predetermined condition may be, for example, completion of the mowing work by the mower 2. Furthermore, the predetermined condition may be, for example, arrival of a predetermined date and time.

When the second determiner 201 determines that the predetermined condition is satisfied, the return instruction unit 202 causes the first traveling controller 206 to start traveling of the mower 2 toward the charging station 3.

Specifically, when the second determiner 201 determines that the remaining amount of the battery 17 is equal to or less than the remaining amount threshold, the return instruction unit 202 causes the first traveling controller 206 to start the traveling of the mower 2 toward the charging station 3.

When the second determiner 201 determines that the predetermined condition is satisfied, the first transmitter 203 transmits a return start signal SB to the charging station 3 via the power reception coil 35. The "return start signal SB" indicates that the mower 2 starts traveling to return to the charging station 3. The "return start signal SB" corresponds to an example of a "specific signal."

Specifically, when the second determiner 201 determines that the predetermined condition is satisfied, the first transmitter 203 outputs to the first transmission and reception circuit 37 an instruction signal for transmitting the return start signal SB to the charging station 3 via the power reception coil 35. According to the instruction signal of the first transmitter 203, the first transmission and reception circuit 37 transmits the return start signal SB to the charging station 3 via the power reception coil 35.

Furthermore, when the first determiner 207 determines that the mower 2 has arrived at a predetermined range AS, the first transmitter 203 transmits a position alignment start signal SP to the charging station 3 via the power reception coil 35. The "position alignment start signal SP" indicates that the mower 2 starts moving to a position where the power reception coil 35 can effectively receive power from the power supply coil 331. The predetermined range AS will be explained later with reference to FIG. 5.

The first receiver 204 receives a signal indicating a position of the charging station 3, via the power reception coil 35. The signal indicating the position of the charging station 3 is intermittently transmitted from the charging station 3.

Specifically, the first receiver 204 outputs to the first transmission and reception circuit 37 an instruction signal for receiving the signal indicating the position of the charging station 3, via the power reception coil 35. According to the instruction signal from the first receiver 204, the first transmission and reception circuit 37 receives the signal indicating the position of the charging station 3, via the power reception coil 35.

The first detector 205 detects a magnetic field generated by the power supplier 33, via the power reception coil 35.

Specifically, the first detector 205 outputs to the first transmission and reception circuit 37 an instruction signal for detecting the magnetic field generated by the power supplier 33, via the power reception coil 35. According to the instruction signal from the first detector 205, the first transmission and reception circuit 37 detects the magnetic field generated by the power supplier 33, via the power reception coil 35.

Although in the present embodiment, the first detector 205 detects the magnetic field generated by the power supplier 33, via the power reception coil 35, the first detector 205 may detect the magnetic field generated by the power supplier 33, via the magnetic sensor SM.

The first traveling controller 206 causes the mower 2 to travel toward the charging station 3, based on a detection result of the first detector 205.

Specifically, the first traveling controller 206 causes the mower 2 to travel in a direction in which the strength of the magnetic field detected by the first detector 205 increases, based on a direction of the magnetic field detected by the first detector 205.

The first determiner 207 determines whether the mower 2 has arrived at the predetermined range AS from the charging station 3, based on the detection result of the first detector 205. The predetermined range AS is a range that allows the power reception coil 35 to receive power from the power supply coil 331, and for example, a distance between the mower 2 and the charging station 3 is 1 m. The predetermined range AS will be explained later in detail with reference to FIG. 5.

When the first determiner 207 determines that the mower 2 has arrived at the predetermined range AS, the second detector 208 detects power PW received by the power reception coil 35 from the power supply coil 331.

The second traveling controller 209 causes the mower 2 to travel, according to a detection result of the second detector 208.

Specifically, the second traveling controller 209 causes the mower 2 to travel back and forth and from side to side and stops the traveling of the mower 2 at a position where the power PW detected by the second detector 208 is equal to or more than a first threshold PSH1. The first threshold PSH1 corresponds to an example of a "power threshold."

Furthermore, the second traveling controller 209 turns the mower 2 and stops the turning of the mower 2 at a position where the power PW detected by the second detector 208 is equal to or more than a second threshold PSH2. The second threshold PSH2 is greater than the first threshold PSH1. The second threshold PSH2 corresponds to an example of a "power threshold."

Processing of the second traveling controller 209 will be explained later in detail with reference to FIG. 6.

Although in the present embodiment, the second traveling controller 209 causes the mower 2 to travel back and forth and from side to side and then turns the mower 2, embodiments of the present invention are not limited to this. The second traveling controller 209 may cause the mower 2 to travel back and forth and from side to side without turning the mower 2. Furthermore, the second traveling controller 209 may turn the mower 2 without causing the mower 2 to travel back and forth and from side to side.

When the second traveling controller 209 stops the turning of the mower 2, the charging controller 210 causes the power reception coil 35 to receive power from the power supply coil 331, thereby starting charging of the battery 17. Furthermore, the charging controller 210 ends the charging of the battery 17 when the charging power amount of the battery 17 is equal to or more than a predetermined threshold.

Although in the present embodiment, the charging controller 210 ends the charging of the battery 17 when the charging power amount of the battery 17 is equal to or more than the predetermined threshold, embodiments of the present invention are not limited to this. For example, the charging controller 210 may end the charging of the battery 17 when the battery 17 is fully charged. Furthermore, for example, the charging controller 210 may end the charging of the battery 17 when a predetermined time elapses from the start of the charging of the battery 17.

The determiner 211 performs the following processing when the charging station 3 includes a plurality of the power supply coils 331. That is, of the plurality of power supply coils 331, the determiner 211 determines the power supply coil 331 in which the power PW detected by the second detector 208 is equal to or more than the power threshold. The charging controller 210 charges the battery 17 through power reception of the power reception coil 35 only from the power supply coil 331 determined by the determiner 211.

Processing of the determiner 211 will be explained later in detail with reference to FIG. 7.

Processing of the first controller 20 will be explained later in detail with reference to FIGS. 5 to 9.

[2-2-2. Configuration of Second Controller]

The second controller 31 controls an operation of the charging station 3. The second controller 31 has, for example, a second processor 31A such as a CPU and a second memory 31B such as an RAM or an ROM. The second memory 31B stores data of, for example, a second control program.

The second controller 31 includes a second transmitter 311, a second receiver 312, and a power supply controller 313. Specifically, the second processor 31A of the second controller 31 executes the second control program stored in the second memory 31B to function as the second transmitter 311, the second receiver 312, and the power supply controller 313.

The second receiver 312 receives the return start signal SB and the position alignment start signal SP via the power supply coil 331. Each of the return start signal SB and the position alignment start signal SP is transmitted from the first transmitter 203 of the first controller 20.

When the return start signal SB is received by the second receiver 312, the second transmitter 311 intermittently transmits the signal indicating the position of the charging station 3, via the power supply coil 331. For example, the second transmitter 311 transmits the signal indicating the position of the charging station 3 at five second intervals.

The signal indicating the position of the charging station 3 is, for example, a signal having a specific frequency distinguishable from other signals. The other signals are, of signals receivable by the first receiver 204 of the mower 2, signals except for the signal indicating the position of the charging station 3. The other signals are, for example, signals of wireless communication such as Wi-Fi (registered trademark).

The power supply controller 313, when receiving the position alignment start signal SP, starts power supply from the power supply coil 331 to the power reception coil 35.

Processing of the second controller 31 will be explained later in detail with reference to FIG. 10.

3. Example of Specific Processing of First Controller

Figure 5:
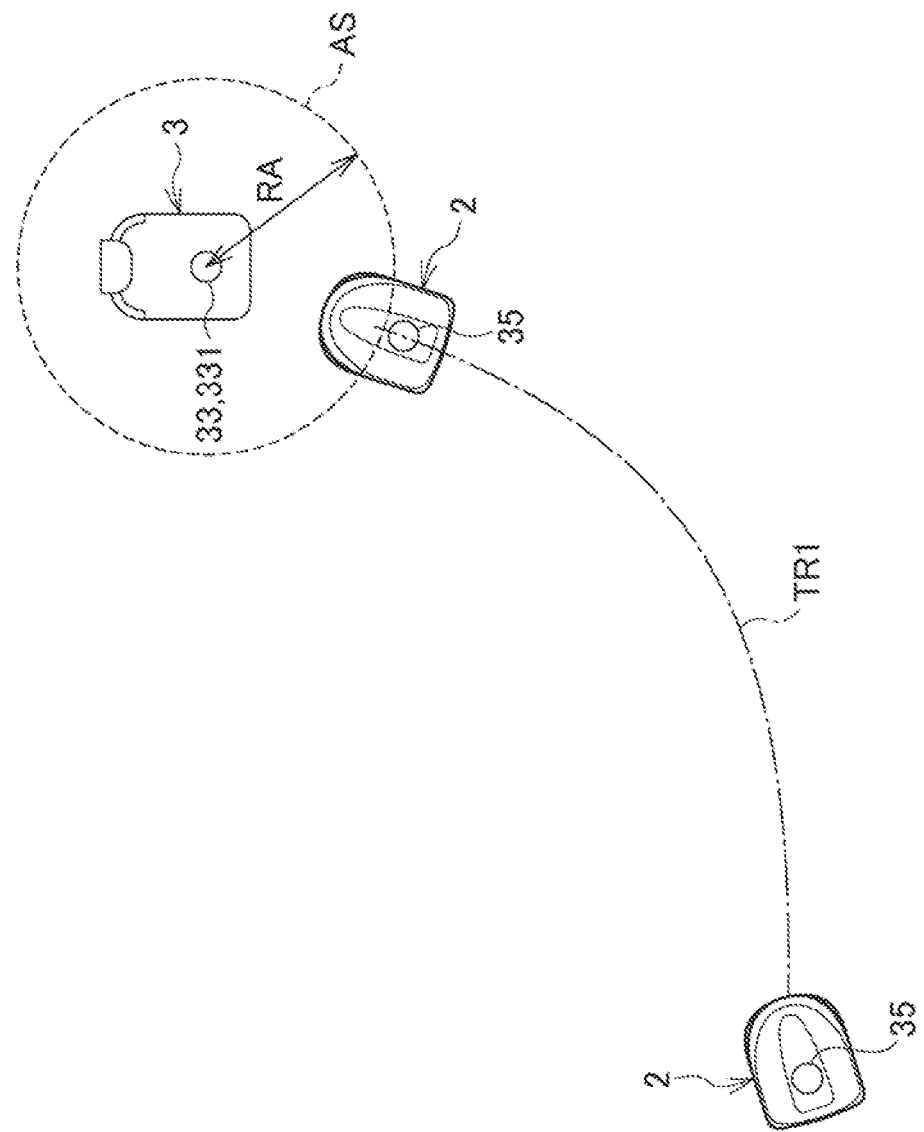
FIG. 5 is a plan view showing an example of a predetermined range.

FIG. 5 is a plan view showing an example of the predetermined range AS.

When the second determiner 201 determines that the remaining amount of the battery 17 is equal to or less than the remaining amount threshold, the return instruction unit 202 causes the first traveling controller 206 to start the traveling of the mower 2 toward the charging station 3.

The first detector 205 detects the magnetic field generated by the power supplier 33, via the power reception coil 35.

The first traveling controller 206 causes the mower 2 to travel in the direction in which the strength of the magnetic field detected by the first detector 205 increases, based on the direction of the magnetic field detected by the first detector 205.

A track TR1 shown in FIG. 5 indicates an example of a track of the traveling of the mower 2 toward the charging station 3. As indicated by the track TR1, the mower 2 travels so as to approach the charging station 3 and arrives at the predetermined range AS.

The predetermined range AS is a range that allows the power reception coil 35 to receive power from the power supply coil 331, and for example, a distance between the mower 2 and the charging station 3 is 1 m. Specifically, a distance RA between a center position of the power supply coil 331 of the charging station 3 and a center position of the power reception coil 35 of the mower 2 is 1 m.

The first determiner 207 determines whether the mower 2 has arrived at the predetermined range AS from the charging station 3, based on the detection result of the first detector 205.

When the first determiner 207 determines that the mower 2 has arrived at the predetermined range AS, the second detector 208 detects the power PW received by the power reception coil 35 from the power supply coil 331.

The second traveling controller 209 executes "position alignment processing" according to the detection result of the second detector 208.

The "position alignment processing" indicates processing for moving the mower 2 to the position where the power reception coil 35 can effectively receive power from the power supply coil 331. The "position alignment processing" will be explained later in detail with reference to FIGS. 6, 7, and 9.

FIG. 6 is a plan view showing an example of the position alignment processing.

The second traveling controller 209 causes the mower 2 to travel back and forth and from side to side and stops the traveling of the mower 2 at the position where the power PW detected by the second detector 208 is equal to or more than the first threshold PSH1. Thereafter, the second traveling controller 209 turns the mower 2 and stops the turning of the mower 2 at the position where the power PW detected by the second detector 208 is equal to or more than the second threshold PSH2.

An upper view of FIG. 6 shows an example of processing in which the second traveling controller 209 causes the mower 2 to travel back and forth and from side to side and stops the traveling of the mower 2 at the position where the power PW detected by the second detector 208 is equal to or more than the first threshold PSH1.

As shown in the upper view of FIG. 6, the second traveling controller 209 causes the mower 2 to travel in a front direction DY1 to move from an initial position P1 to a second position P2. The initial position P1 indicates a position when the mower 2 arrives at the predetermined range AS. The second position P2 indicates a forward limit position set in advance. The front direction DY1 indicates, for example, a direction in which the mower 2 moves to the charging station 3.

When the mower 2 arrives at the second position P2, the second traveling controller 209 causes the mower 2 to travel in a right direction DX to move from the second position P2 to a third position P3. A distance LB between the third position P3 and the second position P2 coincides with, for example, a width of the mower 2. The right direction DX indicates a direction orthogonal to the front direction DY1.

When the mower 2 arrives at the third position P3, the second traveling controller 209 causes the mower 2 to travel in a rear direction DY2 to move from the third position P3 to a fourth position P4. The fourth position P4 indicates a backward limit position set in advance. The backward limit position coincides with, for example, a position in the front-rear direction of the initial position P1.

When the mower 2 arrives at the fourth position P4, the second traveling controller 209 causes the mower 2 to travel in the right direction DX to move from the fourth position P4 to a fifth position P5. The distance LB between the fifth position P5 and the fourth position P4 coincides with, for example, the width of the mower 2.

When the mower 2 arrives at the fifth position P5, the second traveling controller 209 causes the mower 2 to travel in the front direction DY1. The power PW detected by the second detector 208 becomes equal to or more than the first threshold PSH1 at a sixth position P6 where the mower 2 is traveling in the front direction DY1. Then, the second traveling controller 209 stops the traveling of the mower 2 at the sixth position P6.

Note that a speed at which the second traveling controller 209 causes the mower 2 to travel is slower than a speed at which the first traveling controller 206 causes the mower 2 to travel. For example, the speed at which the second traveling controller 209 causes the mower 2 to travel is ⅒ of the speed at which the first traveling controller 206 causes the mower 2 to travel. The speed at which the second traveling controller 209 causes the mower 2 to travel is made slow, so that accuracy of the position alignment can be improved.

A lower view of FIG. 6 shows an example of processing in which the second traveling controller 209 turns the mower 2 and stops the turning of the mower 2 at the position where the power PW detected by the second detector 208 is equal to or more than the second threshold PSH2.

As shown in the lower view of FIG. 6, the second traveling controller 209 turns the mower 2 at the sixth position P6 in the counterclockwise direction. The power PW detected by the second detector 208 becomes equal to or more than the second threshold PSH2 at a seventh position P7 where the mower 2 is turning in the counterclockwise direction. Then, the second traveling controller 209 stops the turning of the mower 2 at the seventh position P7. A point CR indicates a position of a turning center of the mower 2. An angle φ indicates a turning angle from the sixth position P6 to the seventh position P7.

Although in the present embodiment, as shown in the upper view of FIG. 6, the second traveling controller 209 causes the mower 2 to travel so that a track at a center position of a front end of the mower 2 forms a rectangular wave, embodiments of the present invention are not limited to this. For example, the mower 2 may be caused to travel in a direction in which the power PW detected by the second detector 208 increases. In this case, the time required for the position alignment can be shortened.

Furthermore, although in FIG. 6, the second traveling controller 209 turns the mower 2 in the counterclockwise direction, the second traveling controller 209 may turn the mower 2 in the clockwise direction.

Figure 7:
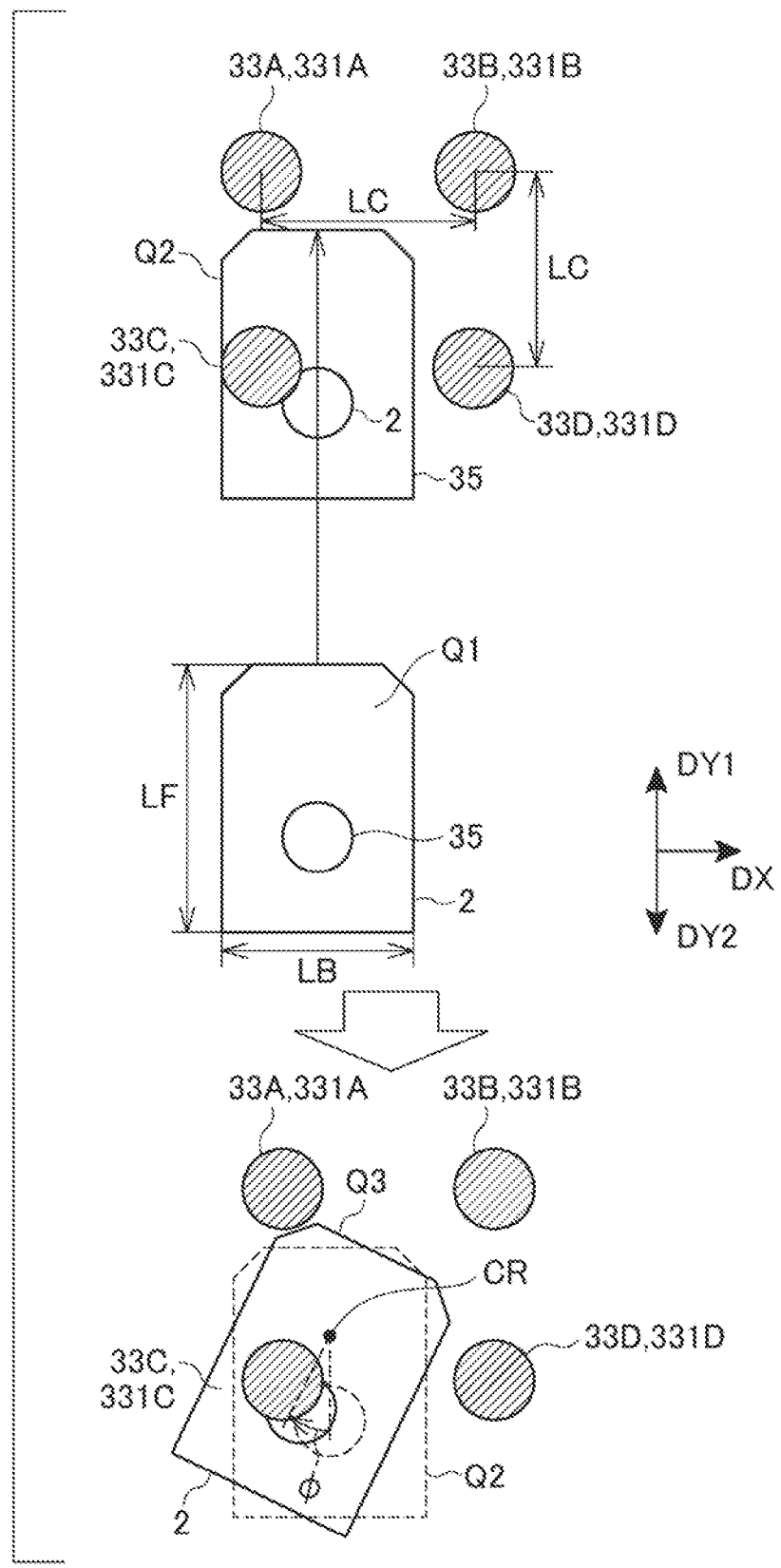
FIG. 7 is a plan view showing another example of the position alignment processing.

FIG. 7 is a plan view showing another example of the position alignment processing. In FIG. 7, the charging station 3 includes the plurality of power supply coils 331. For example, the charging station 3 includes four power suppliers 33. That is, the charging station 3 includes a power supplier 33A, a power supplier 33B, a power supplier 33C, and a power supplier 33D. The power supplier 33A includes a power supply coil 331A, the power supplier 33B includes a power supply coil 331B, the power supplier 33C includes a power supply coil 331C, and the power supplier 33D includes a power supply coil 331D.

The power supplier 33A is disposed in the front direction DY1 of the power supplier 33C, and the power supplier 33B is disposed in the front direction DY1 of the power supplier 33D. Furthermore, the power supplier 33B is disposed in the right direction DX of the power supplier 33A, and the power supplier 33D is disposed in the right direction DX of the power supplier 33C.

A distance LC indicates a distance between a center position of the power supply coil 331A and a center position of the power supply coil 331B. Furthermore, a distance between the center position of the power supply coil 331B and a center position of the power supply coil 331D is the distance LC. The distance LC is, for example, longer than the distance LB and shorter than a distance LF. The distance LB indicates the width of the mower 2, and the distance LF indicates a length of the mower 2 in the front-rear direction.

An upper view of FIG. 7 shows an example of processing in a case where the second traveling controller 209 causes the mower 2 to travel from an initial position Q1 in the front direction DY1 and the power PW detected by the second detector 208 is equal to or more than the first threshold PSH1. The initial position Q1 indicates the position when the mower 2 arrives at the predetermined range AS.

Specifically, the determiner 211 determines that the power supply coil 331C is the power supply coil 331 in which the power PW is equal to or more than the first threshold PSH1, and the second traveling controller 209 stops the traveling of the mower 2 at a second position Q2 where the power PW is equal to or more than the first threshold PSH1.

A lower view of FIG. 7 shows an example of processing in which the second traveling controller 209 turns the mower 2 and stops the turning of the mower 2 at the position where the power PW detected by the second detector 208 is equal to or more than the second threshold PSH2.

As shown in the lower view of FIG. 7, the second traveling controller 209 turns the mower 2 at the second position Q2 in the clockwise direction. The power PW detected by the second detector 208 becomes equal to or more than the second threshold PSH2 at a third position Q3 where the mower 2 is turning in the clockwise direction. Then, the second traveling controller 209 stops the turning of the mower 2 at the third position Q3. The point CR indicates a position of a turning center of the mower 2. The angle φ indicates a turning angle from the second position Q2 to the third position Q3.

In such a case where the charging station 3 includes the plurality of power supply coils 331, the time required for the position alignment can be shortened.

Although in FIG. 7, four power supply coils 331 are disposed in the charging station 3, embodiments of the present invention are not limited to this. It is sufficient that the number of the power supply coils 331 disposed in the charging station 3 is a plural number. For example, two or three power supply coils 331 may be disposed in the charging station 3. Furthermore, equal to or more than five power supply coils 331 may be disposed in the charging station 3.

Furthermore, although in FIG. 7, the second traveling controller 209 turns the mower 2 in the clockwise direction, the second traveling controller 209 may turn the mower 2 in the counterclockwise direction.

4. Processing of First and Second Controllers

[4-1. Processing of First Controller]

Figure 8:
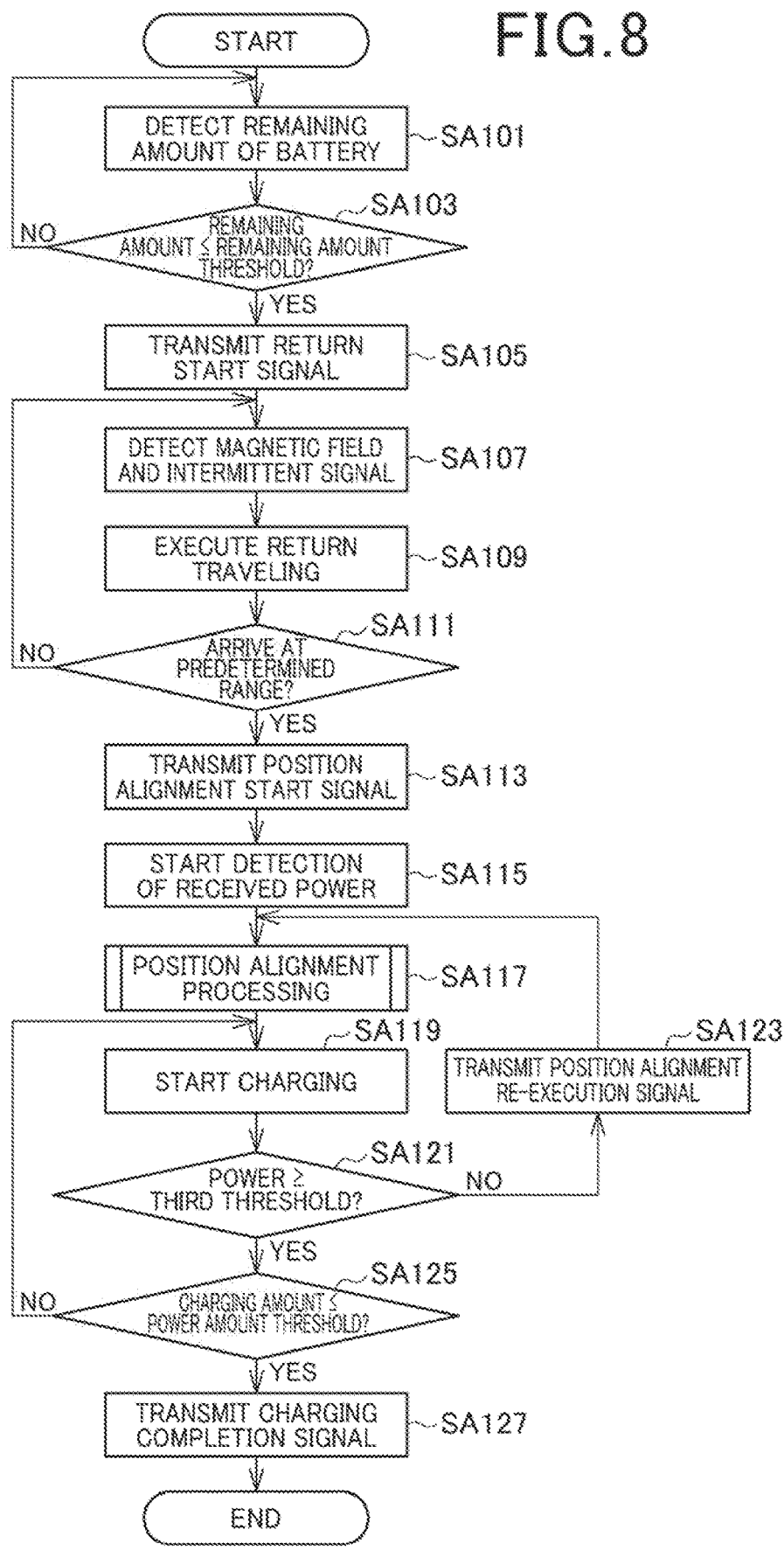
FIG. 8 is a flowchart showing an example of processing of the first controller.

FIG. 8 is a flowchart showing an example of processing of the first controller 20.

Note that in FIGS. 8 to 10, a case where one power supply coil 331 is disposed in the charging station 3 will be explained.

As shown in FIG. 8, the first controller 20 first detects the remaining amount of the battery 17 in step SA101.

Next, in step SA103, the second determiner 201 determines whether the remaining amount of the battery 17 is equal to or less than the remaining amount threshold.

When the second determiner 201 determines that the remaining amount of the battery 17 is not equal to or less than the remaining amount threshold (NO in step SA103), the processing returns to step SA101. When the second determiner 201 determines that the remaining amount of the battery 17 is equal to or less than the remaining amount threshold (YES in step SA103), the processing proceeds to step SA105.

In step SA105, the first transmitter 203 transmits the return start signal SB to the charging station 3 via the power reception coil 35.

Next, in step SA107, the first detector 205 detects the magnetic field generated by the power supplier 33, via the power reception coil 35, and the first receiver 204 receives the intermittent signal indicating the position of the charging station 3, based on the detection result of the first detector 205.

Next, in step SA109, the return instruction unit 202 causes the first traveling controller 206 to execute the traveling of the mower 2 toward the charging station 3. The first traveling controller 206 causes the mower 2 to travel toward the charging station 3, based on the detection result of the first detector 205 and a reception result of the first receiver 204.

Next, in step SA111, the first determiner 207 determines whether the mower 2 has arrived at the predetermined range AS from the charging station 3, based on the detection result of the first detector 205.

When the first determiner 207 determines that the mower 2 has not arrived at the predetermined range AS from the charging station 3 (NO in step SA111), the processing returns to step SA107. When the first determiner 207 determines that the mower 2 has arrived at the predetermined range AS from the charging station 3 (YES in step SA111), the processing proceeds to step SA113.

In step SA113, the first transmitter 203 transmits the position alignment start signal SP to the charging station 3 via the power reception coil 35.

Next, in step SA115, the second detector 208 starts the detection of the power PW received by the power reception coil 35 from the power supply coil 331. Note that the second detector 208 executes the detection of the power PW until charging processing is completed.

Next, in step SA117, the first controller 20 executes the "position alignment processing." The "position alignment processing" will be explained later in detail with reference to FIG. 9.

Next, in step SA119, the charging controller 210 causes the power reception coil 35 to receive power from the power supply coil 331, thereby executing the charging of the battery 17.

Next, in step SA121, the first controller 20 determines whether the power PW detected by the second detector 208 is equal to or more than a third threshold PSH3. For example, the third threshold PSH3 is set in a range of equal to or more than the first threshold PSH1 and equal to or less than the second threshold PSH2.

When the first controller 20 determines that the power PW is not equal to or more than the third threshold PSH3 (NO in step SA121), the processing proceeds to step SA123.

In step SA123, the first transmitter 203 transmits a position alignment re-execution signal to the charging station 3 via the power reception coil 35, and the processing returns to step SA117. The "position alignment re-execution signal" indicates re-execution of the "position alignment processing."

When the first controller 20 determines that the power PW is equal to or more than the third threshold PSH3 (YES in step SA123), the processing proceeds to step SA125.

In step SA125, the first controller 20 determines whether the charging power amount of the battery 17 has arrived at equal to or more than a power amount threshold.

When the first controller 20 determines that the charging power amount of the battery 17 has not arrived at equal to or more than the power amount threshold (NO in step SA125), the processing returns to step SA119. When the first controller 20 determines that the charging power amount of the battery 17 has arrived at equal to or more than the power amount threshold (YES in step SA125), the processing proceeds to step SA127.

In step SA127, the first transmitter 203 transmits a charging completion signal to the charging station 3 via the power reception coil 35, and thereafter the processing ends. The "charging completion signal" indicates completion of the charging processing.

In the present embodiment, as explained in FIG. 8, when the power PW decreases to less than the third threshold PSH3 during the charging, the "position alignment processing" is re-executed. This allows the mower 2 to move to an appropriate position when, for example, the mower 2 is hit by an object and moved and the power PW decreases to less than the third threshold PSH3. Accordingly, the battery 17 of the mower 2 can be effectively charged.

Furthermore, although in the present embodiment, the third threshold PSH3 is equal to or more than the first threshold PSH1 and equal to or less than the second threshold PSH2, embodiments of the present invention are not limited to this. For example, the third threshold PSH3 may be less than the second threshold PSH2. A smaller value of the third threshold PSH3 can reduce a frequency of re-executing the "position alignment processing." A larger value of the third threshold PSH3 can effectively charge the battery 17 of the mower 2.

Figure 9:
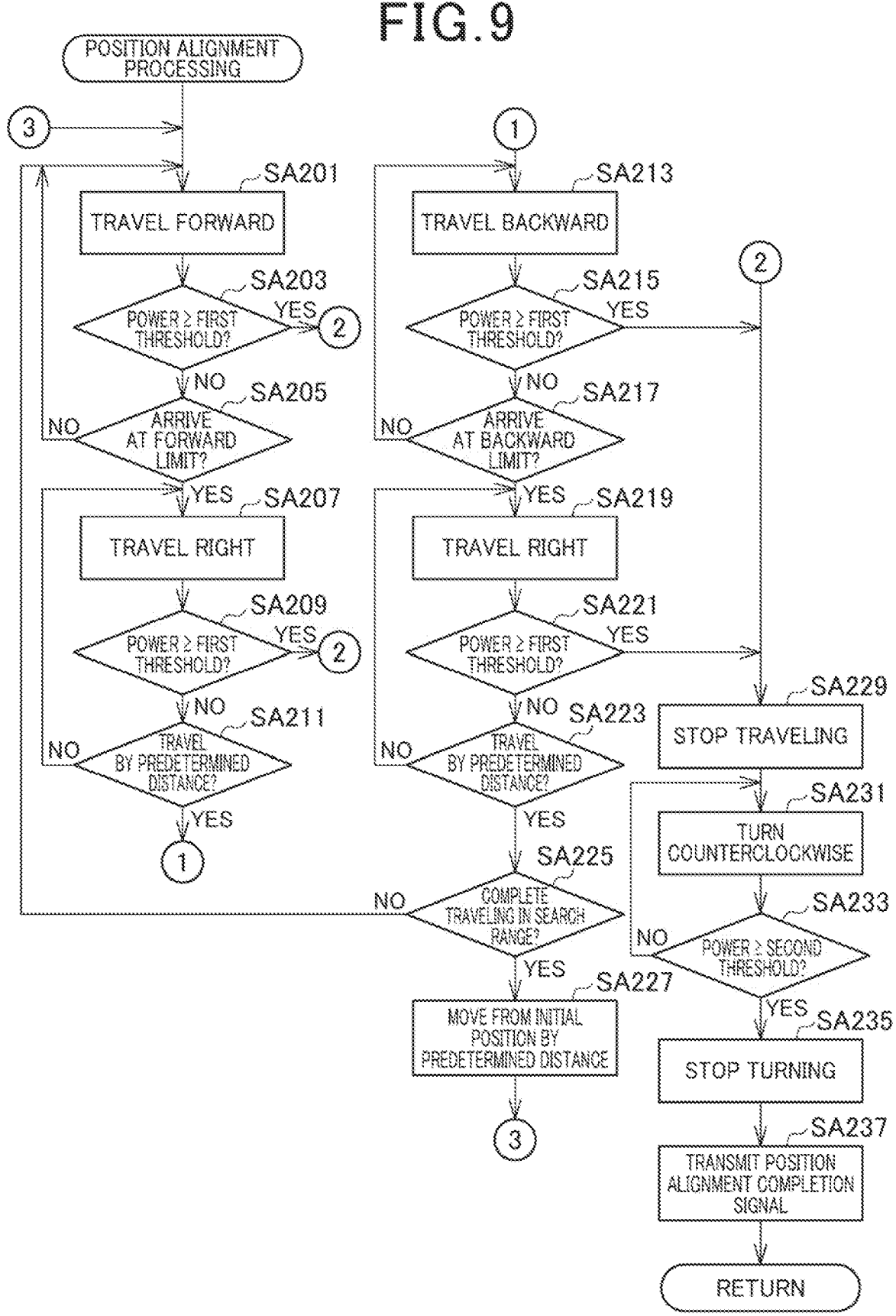
FIG. 9 is a flowchart showing an example of the position alignment processing of the first controller.

FIG. 9 is a flowchart showing an example of the position alignment processing of the first controller 20.

First, in step SA201, the second traveling controller 209 causes the mower 2 to travel in the front direction DY1.

Next, in step SA203, the first controller 20 determines whether the power PW detected by the second detector 208 is equal to or more than the first threshold PSH1.

When the first controller 20 determines that the power PW is equal to or more than the first threshold PSH1 (YES in step SA203), the processing proceeds to step SA229. When the first controller 20 determines that the power PW is not equal to or more than the first threshold PSH1 (NO in step SA203), the processing proceeds to step SA205.

In step SA205, the first controller 20 determines whether the mower 2 has arrived at the forward limit position.

When the first controller 20 determines that the mower 2 has not arrived at the forward limit position (NO in step SA205), the processing returns to step SA201. When the first controller 20 determines that the mower 2 has arrived at the forward limit position (YES in step SA205), the processing proceeds to step SA207.

In step SA207, the second traveling controller 209 causes the mower 2 to travel in the right direction DX.

Next, in step SA209, the first controller 20 determines whether the power PW detected by the second detector 208 is equal to or more than the first threshold PSH1.

When the first controller 20 determines that the power PW is equal to or more than the first threshold PSH1 (YES in step SA209), the processing proceeds to step SA229. When the first controller 20 determines that the power PW is not equal to or more than the first threshold PSH1 (NO in step SA209), the processing proceeds to step SA211.

In step SA211, the first controller 20 determines whether the mower 2 has traveled by a predetermined distance. The predetermined distance is, for example, the distance LB. The distance LB coincides with, for example, the width of the mower 2.

When the first controller 20 determines that the mower 2 has not traveled by the predetermined distance (NO in step SA211), the processing returns to step SA207. When the first controller 20 determines that the mower 2 has traveled by the predetermined distance (YES in step SA211), the processing proceeds to step SA213.

In step SA213, the second traveling controller 209 causes the mower 2 to travel in the rear direction DY2.

Next, in step SA215, the first controller 20 determines whether the power PW detected by the second detector 208 is equal to or more than the first threshold PSH1.

When the first controller 20 determines that the power PW is equal to or more than the first threshold PSH1 (YES in step SA215), the processing proceeds to step SA229. When the first controller 20 determines that the power PW is not equal to or more than the first threshold PSH1 (NO in step SA215), the processing proceeds to step SA217.

In step SA217, the first controller 20 determines whether the mower 2 has arrived at the backward limit position.

When the first controller 20 determines that the mower 2 has not arrived at the backward limit position (NO in step SA217), the processing returns to step SA213. When the first controller 20 determines that the mower 2 has arrived at the backward limit position (YES in step SA217), the processing proceeds to step SA219.

In step SA219, the second traveling controller 209 causes the mower 2 to travel in the right direction DX.

Next, in step SA221, the first controller 20 determines whether the power PW detected by the second detector 208 is equal to or more than the first threshold PSH1.

When the first controller 20 determines that the power PW is equal to or more than the first threshold PSH1 (YES in step SA221), the processing proceeds to step SA229. When the first controller 20 determines that the power PW is not equal to or more than the first threshold PSH1 (NO in step SA221), the processing proceeds to step SA223.

In step SA223, the first controller 20 determines whether the mower 2 has traveled by a predetermined distance. The predetermined distance is, for example, the distance LB. The distance LB coincides with, for example, the width of the mower 2.

When the first controller 20 determines that the mower 2 has not traveled by the predetermined distance (NO in step SA223), the processing returns to step SA219. When the first controller 20 determines that the mower 2 has traveled by the predetermined distance (YES in step SA223), the processing proceeds to step SA225.

In step SA225, the first controller 20 determines whether the traveling of the mower 2 in a search range set in advance is completed. The search range indicates a range in which the mower 2 is traveled back and forth and from side to side.

When the first controller 20 determines that the traveling of the mower 2 in the search range set in advance is not completed (NO in step SA225), the processing returns to step SA201. When the first controller 20 determines that the traveling of the mower 2 in the search range set in advance is completed (YES in step SA225), the processing proceeds to step SA227.

In step SA227, the first controller 20 causes the mower 2 to travel from an initial position to a position moved by the predetermined distance in a predetermined direction, and the processing returns to step SA201. The predetermined direction is either of the right and left directions, and the predetermined distance is smaller than the distance LB. For example, the predetermined distance is ½ of the distance LB.

In the case of YES in step SA203, YES in step SA209, YES in step SA215, or YES in step SA221, the second traveling controller 209 stops the traveling of the mower 2 in step SA229.

Next, in step SA231, the second traveling controller 209 turns the mower 2 in the counterclockwise direction.

Next, in step SA233, the first controller 20 determines whether the power PW detected by the second detector 208 is equal to or more than the second threshold PSH2.

When the first controller 20 determines that the power PW is not equal to or more than the second threshold PSH2 (NO in step SA223), the processing returns to step SA231. When the first controller 20 determines that the power PW is equal to or more than the second threshold PSH2 (YES in step SA223), the processing proceeds to step SA235.

In step SA235, the second traveling controller 209 stops the turning of the mower 2.

Next, in step SA237, the first transmitter 203 transmits a position alignment completion signal to the charging station 3, and the processing returns to step SA119 in FIG. 8. The "position alignment completion signal" indicates completion of the position alignment processing.

[4-2. Processing of Second Controller]

FIG. 10 is a flowchart showing an example of processing of the second controller 31.

As shown in FIG. 10, the second receiver 312 determines whether the return start signal SB is received, in step SB101.

When the second receiver 312 determines that the return start signal SB is not received (NO in step SB101), the processing enters a standby state. When the second receiver 312 determines that the return start signal SB is received (YES in step SB101), the processing proceeds to step SB103.

In step SB103, the second transmitter 311 intermittently transmits the signal indicating the position of the charging station 3, via the power supply coil 331.

Next, in step SB105, the second receiver 312 determines whether the position alignment start signal SP is received.

When the second receiver 312 determines that the position alignment start signal SP is not received (NO in step SB105), the processing enters a standby state. When the second receiver 312 determines that the position alignment start signal SP is received (YES in step SB105), the processing proceeds to step SB107.

In step SB107, the power supply controller 313 starts the power supply from the power supply coil 331 to the power reception coil 35.

Next, in step SB109, the second receiver 312 determines whether the position alignment completion signal is received.

When the second receiver 312 determines that the position alignment completion signal is not received (NO in step SB109), the processing enters a standby state. When the second receiver 312 determines that the position alignment completion signal is received (YES in step SB109), the processing proceeds to step SB111.

In step SB111, the second receiver 312 determines whether the position alignment re-execution signal is received.

When the second receiver 312 determines that the position alignment re-execution signal is received (YES in step SB111), the processing returns to step SB109. When the second receiver 312 determines that the position alignment re-execution signal is not received (NO in step SB111), the processing proceeds to step SB113.

In step SB113, the second receiver 312 determines whether the charging completion signal is received.

When the second receiver 312 determines that the charging completion signal is not received (NO in step SB113), the processing returns to step SB109. When the second receiver 312 determines that the charging completion signal is received (YES in step SB113), the processing proceeds to step SB115.

In step SB115, the power supply controller 313 stops the power supply from the power supply coil 331 to the power reception coil 35, and thereafter the processing ends.

5. Effect of the Present Embodiment

As explained above, in the present embodiment, the wireless power supply system 30 includes the mower 2 that executes the mowing work while traveling autonomously, and the charging station 3 that supplies power to the mower 2. The charging station 3 includes the power supply coil 331, and the mower 2 includes the power reception coil 35, the first detector 205 that detects the magnetic field generated by the power supply coil 331, and the first traveling controller 206 that causes the mower 2 to travel toward the charging station 3, based on the detection result of the first detector 205.

That is, the first detector 205 detects the magnetic field generated by the power supply coil 331, and the first traveling controller 206 causes the mower 2 to travel toward the charging station 3, based on the detection result of the first detector 205. Accordingly, with a simple configuration, the mower 2 can be caused to travel toward the charging station 3.

In other words, the power supply coil 331 and the power reception coil 35 are configurations for charging the battery 17, and these configurations cause the mower 2 to travel toward the charging station 3, so that, with a simple configuration, the mower 2 can be caused to travel toward the charging station 3.

Furthermore, each of the mower 2 and the charging station 3 according to the present embodiment can obtain an effect similar to that described above.

Furthermore, the first detector 205 uses the power reception coil 35 to detect the magnetic field generated by the power supply coil 331.

The power reception coil 35 thus detects the magnetic field generated by the power supply coil 331, so that the magnetic field generated by the power supply coil 331 can be detected without disposition of, for example, a sensor for detecting the magnetic field. Accordingly, with a simple configuration, the mower 2 can be caused to travel toward the charging station 3.

Furthermore, the mower 2 includes the magnetic sensor SM, and the first detector 205 uses the magnetic sensor SM to detect the magnetic field generated by the power supply coil 331.

Accordingly, the magnetic field generated by the power supply coil 331 can be accurately detected.

Furthermore, the mower 2 includes the first determiner 207 that determines whether the mower 2 has arrived at the predetermined range AS from the charging station 3, based on the detection result of the first detector 205; the second detector 208 that, when the first determiner 207 determines that the mower 2 has arrived at the predetermined range AS, detects the power received by the power reception coil 35 from the power supply coil 331; and the second traveling controller 209 that causes the mower 2 to travel, according to the detection result of the second detector 208.

That is, when the first determiner 207 determines that the mower 2 has arrived at the predetermined range AS, the second detector 208 detects the power PW received by the power reception coil 35 from the power supply coil 331, and the second traveling controller 209 causes the mower 2 to travel, according to the detection result of the second detector 208. This can cause the mower 2 to travel so as to increase the power PW received by the power reception coil 35 from the power supply coil 331. Accordingly, power supply efficiency from the power supply coil 331 to the power reception coil 35 can be improved.

Furthermore, the mower 2 includes the battery 17, and the charging controller 210 that causes the power reception coil 35 to receive power from the power supply coil 331, thereby charging the battery 17. The second traveling controller 209 causes the mower 2 to travel back and forth and from side to side and stops the traveling of the mower 2 at the position where the power PW detected by the second detector 208 is equal to or more than the first threshold PSH1. When the second traveling controller 209 stops the traveling of the mower 2, the charging controller 210 starts the charging of the battery 17.

That is, the second traveling controller 209 causes the mower 2 to travel back and forth and from side to side and stops the traveling of the mower 2 at the position where the power PW detected by the second detector 208 is equal to or more than the first threshold PSH1, and when the second traveling controller 209 stops the traveling of the mower 2, the charging controller 210 starts the charging of the battery 17. Accordingly, the battery 17 can be charged in a state where the power PW is equal to or more than the first threshold PSH1, improving the charging efficiency. This can consequently shorten the charging time of the battery 17.

Furthermore, the mower 2 includes the battery 17, and the charging controller 210 that causes the power reception coil 35 to receive power from the power supply coil 331, thereby charging the battery 17. The second traveling controller 209 turns the mower 2 and stops the turning of the mower 2 at the position where the power PW detected by the second detector 208 is equal to or more than the second threshold PSH2. When the second traveling controller 209 stops the turning of the mower 2, the charging controller 210 starts the charging of the battery 17.

That is, the second traveling controller 209 turns the mower 2 and stops the turning of the mower 2 at the position where the power PW detected by the second detector 208 is equal to or more than the second threshold PSH2, and when the second traveling controller 209 stops the turning of the mower 2, the charging controller 210 starts the charging of the battery 17. Accordingly, the battery 17 can be charged in a state where the power PW is equal to or more than the second threshold PSH2, improving the charging efficiency. This can consequently shorten the charging time of the battery 17.

Furthermore, the mower 2 includes the battery 17, and the charging controller 210 that causes the power reception coil 35 to receive power from the power supply coil 331, thereby charging the battery 17. The charging station 3 includes the plurality of power supply coils 331. The mower 2 includes the determiner 211 that determines, of the plurality of power supply coils 331, the power supply coil 331 in which the power PW detected by the second detector 208 is equal to or more than the first threshold PSH1. The charging controller 210 charges the battery 17 through the power reception of the power reception coil 35 only from the power supply coil 331 determined by the determiner 211.

That is, of the plurality of power supply coils 331, the determiner 211 determines the power supply coil 331 in which the power PW detected by the second detector 208 is equal to or more than the first threshold PSH1, and the charging controller 210 charges the battery 17 through the power reception of the power reception coil 35 only from the power supply coil 331 determined by the determiner 211. This enables the battery 17 to be charged in the state where the power PW is equal to or more than the first threshold PSH1, improving the charging efficiency. Accordingly, the charging time of the battery 17 can be shortened.

Furthermore, the mower 2 includes the second determiner 201 that determines whether the predetermined condition is satisfied, and the return instruction unit 202 that, when the second determiner 201 determines that the predetermined condition is satisfied, causes the first traveling controller 206 to start the traveling of the mower 2 toward the charging station 3.

That is, when the second determiner 201 determines that the predetermined condition is satisfied, the return instruction unit 202 causes the first traveling controller 206 to start the traveling of the mower 2 toward the charging station 3. Accordingly, appropriately setting the predetermined condition can start the traveling of the mower 2 toward the charging station 3 at an appropriate timing.

Furthermore, the mower 2 includes the first transmitter 203 that, when the second determiner 201 determines that the predetermined condition is satisfied, transmits the return start signal SB to the charging station 3 via the power reception coil 35, and the first receiver 204 that receives a signal from the charging station 3. The charging station 3 includes the second receiver 312 that receives the return start signal SB via the power supply coil 331, and the second transmitter 311 that, when the return start signal SB is received by the second receiver 312, intermittently transmits the signal indicating the position of the charging station 3, via the power supply coil 331. The first receiver 204 receives the signal indicating the position of the charging station 3, via the power reception coil 35.

That is, when the second determiner 201 determines that the predetermined condition is satisfied, the first transmitter 203 transmits the return start signal SB to the charging station 3 via the power reception coil 35, and when the return start signal SB is received by the second receiver 312, the second transmitter 311 intermittently transmits the signal indicating the position of the charging station 3, via the power supply coil 331. Accordingly, the mower 2 can travel toward the charging station 3 based on the signal indicating the position of the charging station 3. Furthermore, the signal indicating the position of the charging station 3 is an intermittent signal, thus allowing the second transmitter 311 of the charging station 3 to have a reduced load on the transmission of the signal indicating the position of the charging station 3 and allowing the first receiver 204 of the mower 2 to have a reduced load on the reception of the signal indicating the position of the charging station 3.

Furthermore, the predetermined condition includes that the remaining amount of the battery 17 is equal to or less than the remaining amount threshold.

That is, when the second determiner 201 determines that the remaining amount of the battery 17 is equal to or less than the remaining amount threshold, the return instruction unit 202 causes the first traveling controller 206 to start the traveling of the mower 2 toward the charging station 3.

Accordingly, the traveling of the mower 2 toward the charging station 3 can be caused to start at an appropriate timing.

6. Other Embodiments

The present invention is not limited to the configuration of the above embodiment and may be implemented in various aspects without departing from the gist of the present invention.

For example, although in the present embodiment, the "autonomous traveling work machine" is the mower 2, the present invention is not limited to this. The "autonomous traveling work machine" may execute a predetermined work while traveling autonomously. For example, the "autonomous traveling work machine" may be a security robot that performs a monitoring work while traveling autonomously. Furthermore, for example, the "autonomous traveling work machine" may be a snow removal robot that performs a snow removal work while traveling autonomously.

Furthermore, although in the present embodiment, the power supplier 33 of the charging station 3 includes the power supply coil 331 and the power supply core 332, embodiments of the present invention are not limited to this. It is sufficient that the power supplier 33 of the charging station 3 includes the power supply coil 331.

Furthermore, although in the present embodiment, the power supply coil 331 of the charging station 3 is positioned above the power reception coil 35 of the mower 2, embodiments of the present invention are not limited to this. For example, the power supply coil 331 of the charging station 3 may be positioned below the power reception coil 35 of the mower 2. Furthermore, for example, the power supply coil 331 of the charging station 3 may be positioned beside the power reception coil 35 of the mower 2.

Furthermore, although in the present embodiment, the charging station 3 and the mower 2 communicate with each other via the power supply coil 331 and the power reception coil 35, embodiments of the present invention are not limited to this. For example, the charging station 3 and the mower 2 may wirelessly communicate with each other by using Wi-Fi (registered trademark) or the like.

Furthermore, at least a part of the functional blocks shown in the drawings such as FIGS. 3 and 4 may be implemented by hardware or may be configured to be implemented by cooperation of hardware and software, which is not limited to a configuration in which hardware resources are disposed independently as shown in the drawings.

Furthermore, the control program executed by each of the first controller 20 and the second controller 31 may be stored in another storage in the memory. Furthermore, a configuration may be provided in which a control program stored in an external device is acquired via a communicator or the like and executed.

Furthermore, the processing of each of the first controller 20 and the second controller 31, for facilitation of the understanding, is divided into the processing units in each of the flowcharts shown in FIGS. 8 to 10, according to the main processing contents. The embodiment is not limited by a method of the division into the processing units shown in each of the flowcharts shown in FIGS. 8 to 10 and by names of the processing units. Furthermore, according to the processing contents, the processing of each of the first controller 20 and the second controller 31 may be divided into still more processing units, and one processing unit may be divided so as to include still more processes.

Furthermore, processing procedures of the above flowcharts are also not limited to the illustrated examples.

REFERENCE SIGNS LIST

1: unmanned mowing system
30: wireless power supply system (charging control system)
2: robotic mower, mower (autonomous traveling work machine)
11: housing
12: front wheel
13: rear wheel
14: work unit
141: cutting blade disc
15: traveling motor
16: work unit driving motor
17: battery
18: charging control circuit
20: first controller
20A: first processor
20B: first memory
201: second determiner
202: return instruction unit
203: first transmitter
204: first receiver
205: first detector
206: first traveling controller
207: first determiner
208: second detector
209: second traveling controller
210: charging controller
211: determiner
35: power reception coil
36: power reception circuit
43: resonant rectifier circuit
44: voltage adjustment converter
37: first transmission and reception circuit
3: charging station
31: second controller
31A: second processor
31B: second memory
311: second transmitter
312: second receiver
313: power supply controller
32: power supply circuit
41: power source circuit
42: power supply control circuit
33: power supplier
331: power supply coil
331A to 331D: power supply coil
332: power supply core
34: second transmission and reception circuit
AR: predetermined range
DY1: front direction
DY2: rear direction
DX: right direction
LB, LC, LF: distance
P1, Q1: initial position
PSH1: first threshold (power threshold)
PSH2: second threshold (power threshold)
PW: power
SB: return start signal (specific signal)
SM: magnetic sensor
SP: position alignment start signal

What is claimed is:

1. A charging control system comprising: an autonomous traveling work machine configured to execute a predetermined work while traveling autonomously; and a charging station configured to supply power to the autonomous traveling work machine,
the autonomous traveling work machine comprises a first processor, a first transmission and reception circuit, and a plurality of power supply coils disposed in a front-rear direction and a left-right direction to each other,
the charging station comprises a second processor, a second transmission and reception circuit, and a power supply coil,
wherein the autonomous traveling work machine includes a housing that stores a battery which supplies operation power to each unit of the autonomous traveling work machine, a traveling motor for the autonomous traveling work machine to travel, and a work unit driving motor for a cutting blade disk of a work unit,
wherein the second transmission and reception circuit, under control of the second processor, causes a current corresponding to a signal indicating a position of the charging station to flow to the power supply coils,
wherein the first transmission and reception circuit receives a signal indicating the position of the charging station from the power supply coils by detecting a variation in a magnetic field generated by the power supply coils using the power reception coil,
wherein the first processor causes the autonomous traveling work machine to travel in a direction in which a strength of the magnetic field detected increases, based on a direction of the magnetic field detected,
wherein the first processor causes the autonomous traveling work machine to turn around a turning center of the autonomous traveling work machine, the turning center being spaced a distance from the power reception coil, and
wherein the first processor determines that the magnetic field generated by one of said plurality of power supply coils is equal to or greater than a first threshold value and uses said one power supply coil as an active power supply coil this time, turns the autonomous traveling work machine, around the turning center, from a position where the magnetic field generated by the one power supply coil is equal to or greater than the first threshold value, and stops turning the autonomous traveling work machine at a position where the magnetic field generated by the one power supply coil becomes equal to or greater than a second threshold value to align the power reception coil with the one power supply coil.

2. The charging control system according to claim 1, wherein the first processor of the traveling work machine determines whether the autonomous traveling work machine has arrived at a predetermined range from the charging station based on the received signal indicating the position of the charging station,
when the first processor determines that the autonomous traveling work machine has arrived at the predetermined range, the first processor causes the autonomous traveling work machine to travel, according to the received signal indicating the position of the charging station.

3. The charging control system according to claim 2, wherein the first processor causes the power reception coil to receive power from the one power supply coil, thereby charging the battery, causes the autonomous traveling work machine to travel back and forth and from side to side, and stops traveling of the autonomous traveling work machine at a position where the power detected using the power reception coil is equal to or greater than a power threshold, and
when the first processor stops the traveling of the autonomous traveling work machine, the first processor starts charging of the battery.

4. The charging control system according to claim 2, wherein the first processor causes the power reception coil to receive power from the one power supply coil, thereby charging the battery,
the first processor causes the autonomous traveling work machine to stop turning of the autonomous traveling work machine at a position where the power detected using the power reception coil is equal to or greater than a power threshold, and
when the first processor stops the turning of the autonomous traveling work machine, the first processor starts charging of the battery.

5. The charging control system according to claim 2, wherein the first processor causes the power reception coil to receive power from the one power supply coil, thereby charging the battery.

6. The charging control system according to claim 3, wherein the first processor of the autonomous traveling work machine determines whether a predetermined condition is satisfied; and
when the first processor determines that the predetermined condition is satisfied, the first processor causes the autonomous traveling work machine to start traveling toward the charging station.

7. The charging control system according to claim 6, wherein the first processor of the autonomous traveling work machine transmits a specific signal, by the first transmission and reception circuit, to the charging station via the power reception coil, when the first processor determines that the predetermined condition is satisfied, and
receives a signal from the charging station,
the second processor of the charging station receives the specific signal via the power supply coils; and
when the specific signal is received by the second processor, the second processor intermittently transmits a signal indicating the position of the charging station, by the second transmission and reception circuit via the power supply coils, and
the first transmission and reception circuit receives the signal indicating the position of the charging station, via the power reception coil.

8. The charging control system according to claim 6, wherein the predetermined condition comprises a condition that a remaining amount of the battery is equal to or less than a remaining amount threshold.

9. The charging control system according to claim 1, wherein the cutting blade disk is provided at a lower portion of the housing to drive rotationally, and
the power reception coil is disposed on an upper portion of the housing and exposed to an outside from a top surface of the housing.

10. The charging control system according to claim 1, wherein the first processor determines the one power supply coil regardless of the direction from which the autonomous traveling work machine enters the charging station.

* * * * *